(12) United States Patent
Hoellinger et al.

(10) Patent No.: US 12,382,852 B2
(45) Date of Patent: Aug. 12, 2025

(54) METHOD FOR WORKING A PLOT OF LAND BY AT LEAST TWO AGRICULTURAL ROBOTS

(71) Applicant: KUHN SAS, Saverne (FR)

(72) Inventors: Marie Hoellinger, Rimling (FR); Philippe Potier, Zittersheim (FR); Quentin Labourey, Ostwald (FR); Benoît Jarrassier, Ottersthal (FR)

(73) Assignee: KUHN SAS, Saverne (FR)

( * ) Notice: Subject to any disclaimer, the term of this patent is extended or adjusted under 35 U.S.C. 154(b) by 164 days.

(21) Appl. No.: 18/246,382

(22) PCT Filed: Sep. 14, 2021

(86) PCT No.: PCT/EP2021/075213
§ 371 (c)(1),
(2) Date: Mar. 23, 2023

(87) PCT Pub. No.: WO2022/063639
PCT Pub. Date: Mar. 31, 2022

(65) Prior Publication Data
US 2023/0371416 A1    Nov. 23, 2023

(30) Foreign Application Priority Data

Sep. 24, 2020  (FR) .................................. 2009705

(51) Int. Cl.
*A01B 69/00*    (2006.01)
*G05D 1/00*    (2006.01)

(52) U.S. Cl.
CPC ......... *A01B 69/004* (2013.01); *G05D 1/0219* (2013.01); *G05D 1/0278* (2013.01); *G05D 1/0291* (2013.01)

(58) Field of Classification Search
CPC .. A01B 69/004; G05D 1/0219; G05D 1/0278; G05D 1/0291
See application file for complete search history.

(56) References Cited

U.S. PATENT DOCUMENTS

| 2007/0233374 A1 | 10/2007 | Diekhans et al. |
| 2018/0364739 A1 * | 12/2018 | Foster .................. G05D 1/0268 |
| 2019/0146513 A1 | 5/2019 | Tomita et al. |

FOREIGN PATENT DOCUMENTS

| EP | 3 508 045 A1 | 7/2019 | |
| WO | WO-2017195510 A1 * | 11/2017 | ............... G05D 1/02 |

OTHER PUBLICATIONS

T. Blender, T. Buchner, B. Fernandez, B. Pichlmaier and C. Schlegel, "Managing a Mobile Agricultural Robot Swarm for a seeding task," IECON 2016—42nd Annual Conference of the IEEE Industrial Electronics Society, Florence, Italy, 2016, pp. 6879-6886. (Year: 2016).*

(Continued)

*Primary Examiner* — Joan T Goodbody
(74) *Attorney, Agent, or Firm* — Oblon, McClelland, Maier & Neustadt, L.L.P.

(57) ABSTRACT

A method for working a plot of land simultaneously by agricultural robots in accordance with instructions and/or commands transmitted by a common central management and control system, the method including: subdividing the plot of land to be worked into distinct work zones as strips having respective ends at the two opposite extremities thereof, and into a turn zone extending along the various opposite ends of the trips; subdividing each turn zone into turn portions, each of which faces and continues from one of the two ends of one of the strips forming work zones; and assigning a fraction of a turn portion to the robot that either is about to pass or is in the process of passing through the designated turn portion, or is going to start, is in the process (Continued)

Fig. 6 of completing or going to complete work in the work zone associated with the designated turn portion.

13 Claims, 7 Drawing Sheets

(56) References Cited

OTHER PUBLICATIONS

I. A. Hameed, A. I. Cour-Harbo and K. D. Hansen, "Task and motion planning for selective weed control using a team of autonomous vehicles," 2014 13th International Conference on Control Automation Robotics & Vision (ICARCV), Singapore, 2014, pp. 1853-1857. (Year: 2014).*

I. A. Hameed, "A Coverage Planner for Multi-Robot Systems in Agriculture," 2018 IEEE International Conference on Real-time Computing and Robotics (RCAR), Kandima, Maldives, 2018, pp. 698-704 (Year: 2018).*

Image and text of WO_2017195510 (Year: 2017).*

F. Rovira-Más, V. Saiz-Rubio and A. Cuenca-Cuenca, "Augmented Perception for Agricultural Robots Navigation," in IEEE Sensors Journal, vol. 21, No. 10, pp. 11712-11727, 15 May 15, 2021. (Year: 2021).*

J. Katupitiya, R. Eaton and T. Yaqub, "Systems Engineering Approach to Agricultural Automation: New Developments," 2007 1st Annual IEEE Systems Conference, Honolulu, HI, USA, 2007, pp. 1-7. (Year: 2007).*

D. Ball et al., "Farm Workers of the Future: Vision-Based Robotics for Broad-Acre Agriculture," in IEEE Robotics & Automation Magazine, vol. 24, No. 3, pp. 97-107, Sep. 2017. (Year: 2017).*

C. Cariou, R. Lenain, B. Thuilot and P. Martinet, "Motion planner and lateral-longitudinal controllers for autonomous maneuvers of a farm vehicle in headland," 2009 IEEE/RSJ International Conference on Intelligent Robots and Systems, St. Louis, MO, USA, 2009, pp. 5782-5787. (Year: 2009).*

International Search Report & Written Opinion mailed on Dec. 23, 2021 in PCT/EP2021/075213 filed on Sep. 14, 2021 (10 pages).

* cited by examiner

METHOD FOR WORKING A PLOT OF LAND BY AT LEAST TWO AGRICULTURAL ROBOTS

The present invention relates to the agricultural machinery field and more specifically that of working the soil or plants of an agricultural plot of land, and its subject is a method for working a plot of land automatically and simultaneously by a fleet of at least two agricultural machines or robots, as well as an agricultural machinery assembly to perform this method.

In the agricultural field, it is known that when working a plot of land using a fleet of several autonomous agricultural vehicles (robots), the distribution of the work within the plot of land is critical to guarantee the efficiency of the system. Similarly, it is essential to minimise the possible collisions between the various vehicles.

Figure 1:
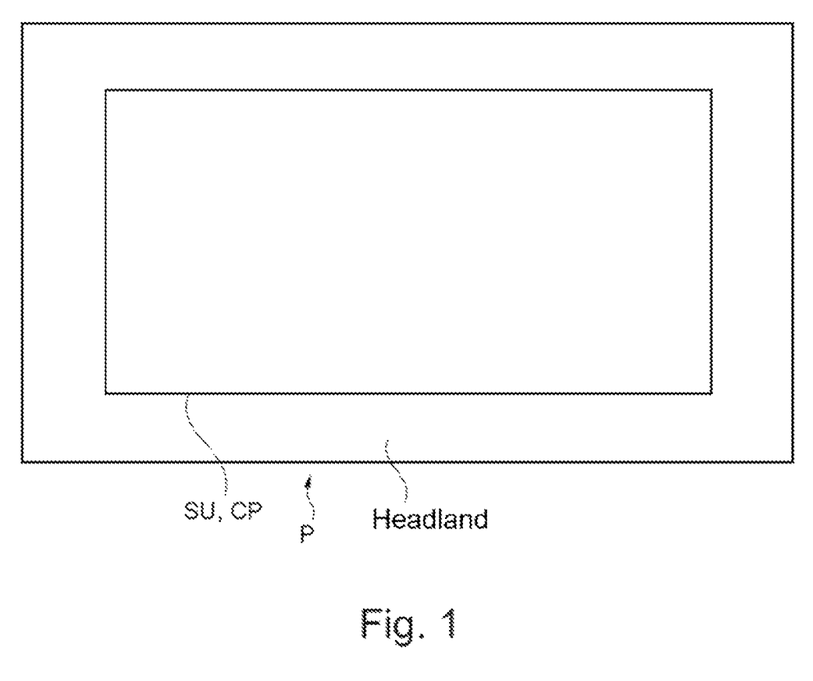
Figure 2:
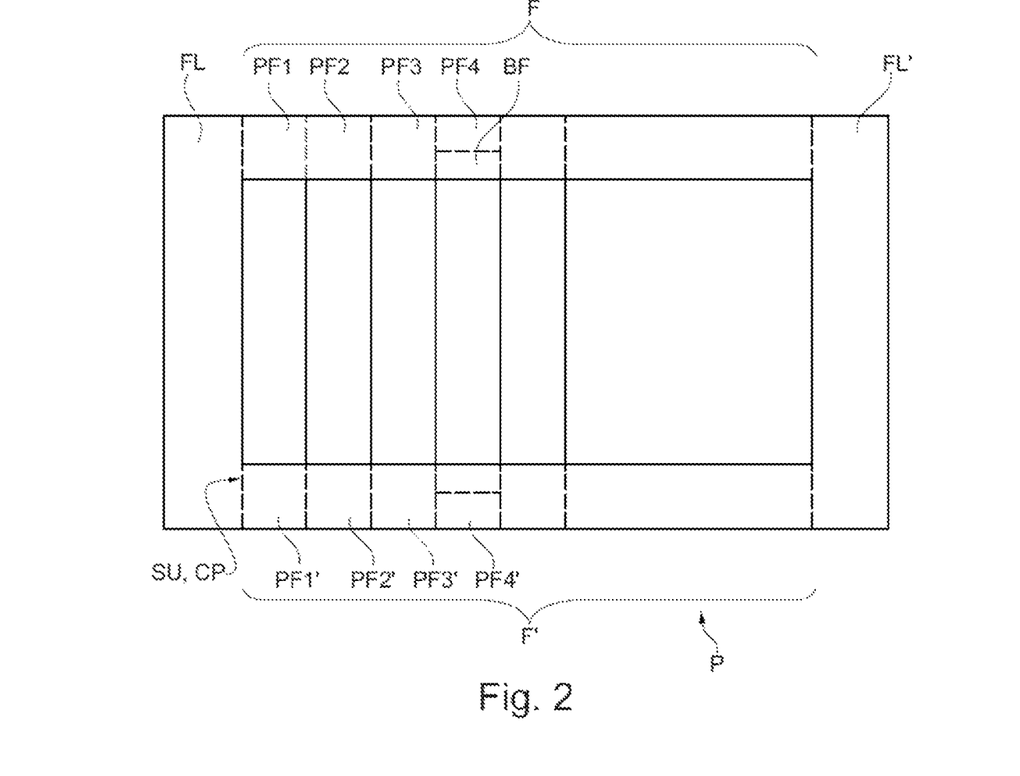
FIG. 2 shows, for a rectangular plot of land, a partial division of the field into work areas with a headland area all around the perimeter and subdivided into portions.
Figure 3:
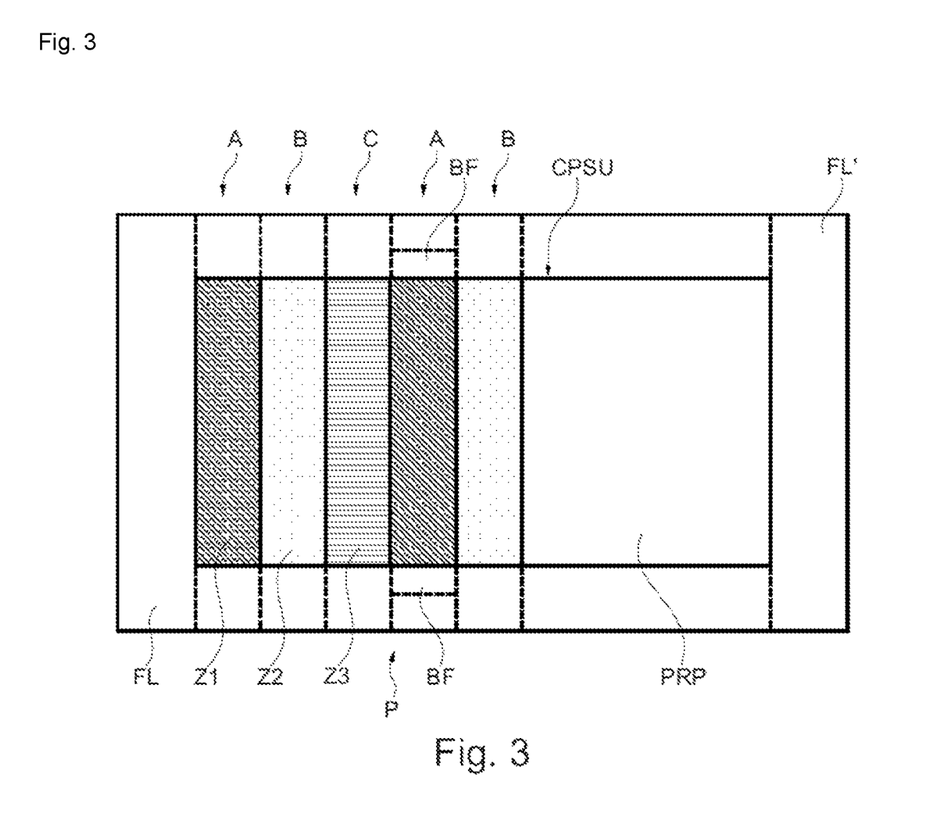
FIG. 3 shows the plot of land of FIG. 2 after assignment with alternating uniform work areas according to a same repetitive pattern or scheme of the type A-B-C, A-B-C, . . .
Figure 4:
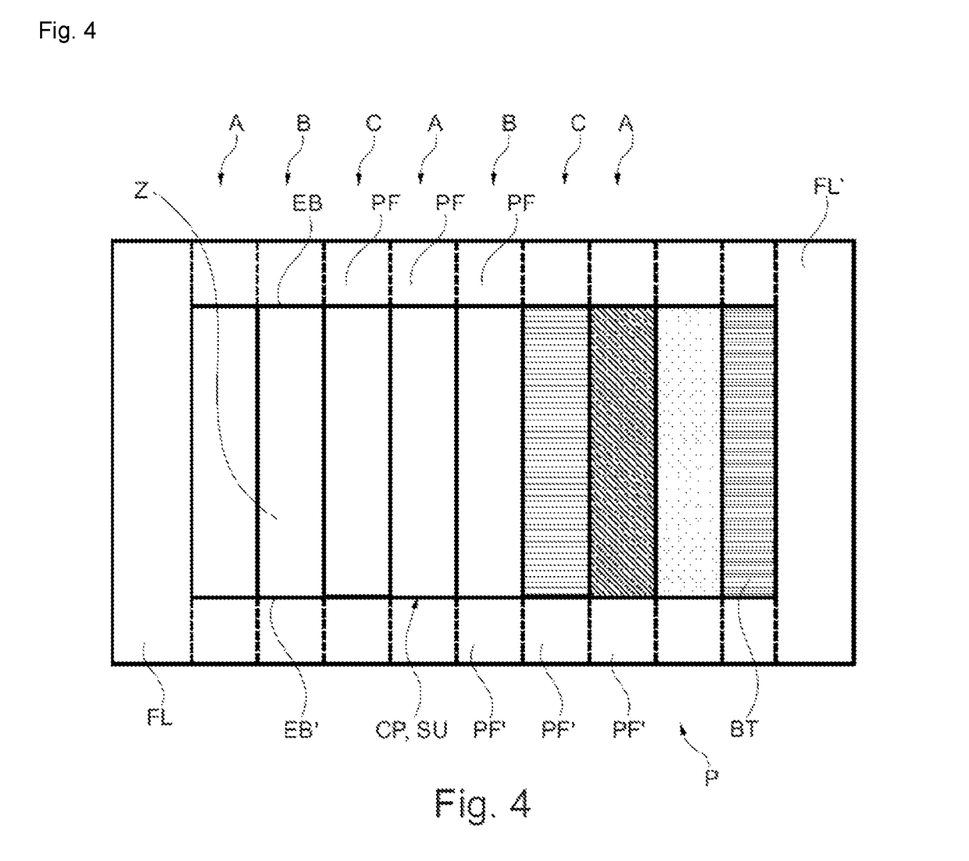
FIG. 4 shows the plot of land of FIGS. 2 and 3 after subdivision of the entire field with alternate assignment of uniform work areas according to a different repetitive pattern or scheme similar to that of FIG. 3 and with a (terminal) strip of different size (narrower)
Figure 5:
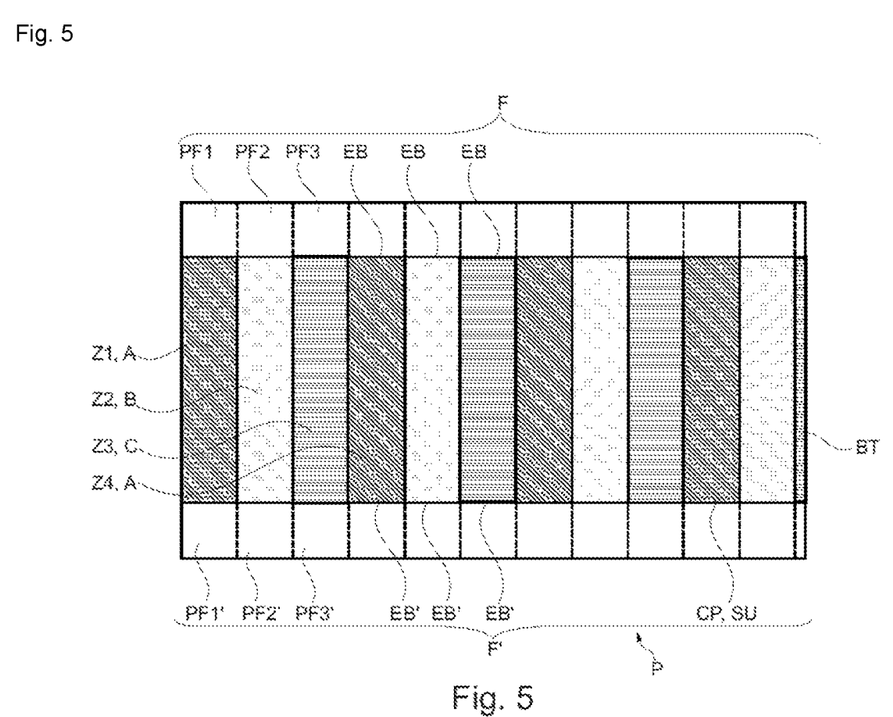
FIG. 5 shows a plot of land with subdivision of the entire field and with alternate assignment of uniform work areas according to the same repetitive pattern or scheme as that shown on FIG. 4 (type A-B-C, A-B-C, . . . ), without lateral headland (only headlands at the opposite extremities of the rows) and with a (terminal) strip of different size.

Typically, a plot of land P is divided into a main field CP (optimally usable surface area SU) and a headland area on the edge of this main field over all or part of its peripheral circumference (see FIG. 1—headland all around the perimeter of the field). Traditionally, this headland is at least present at each end of the rows or work paths of the plot of land and is used by the vehicles to make U-turns and more generally to manoeuvre from one row to the next of the main field.

In a known and usual manner, the autonomous robotic vehicles of a given fleet communicate with one another (by radiofrequency channel, directly or via a central system) to constantly know the positions of the other vehicles. Other solutions of master/slave type (a slave robot follows and reproduces the path of a master robot) also exist.

However, these known solutions require constant two-directional exchanges and therefore permanent communication between the robots: this results in complex requirements in terms of data streams and connections between the vehicles and the network.

As an alternative, the known master/slave type solutions require a dependency of the slave robot(s) with respect to the master robot(s): consequently, the two types of vehicles cannot really work independently, but only in pairs or in groups, which reduces the efficiency. Furthermore, the robot(s) must once again be managed via a permanent communication link.

Lastly, other solutions recommend dividing the plot of land to be worked into work areas of fixed width corresponding to the working width of the agricultural robots used (each area is worked in one passage) and assigning these plots of land to the various robots, these plots of land being assigned/reassigned in real time as the work carried out by the various robots proceeds and according to the development of the situation. A solution of this type is disclosed by document EP 3 508 045 or US 2019/0146513.

In this latter solution, when a robot wants to go to a new area (after finishing its task in a given area) passing via the headland, or wants to make a U-turn in the headland at the end of the area, and an obstacle (in particular another robot) blocks its passage, then this robot transiting or leaving the area either waits until the path is clear or looks for an alternative route to reach the objective or perform its manoeuvre (choice of the shortest alternative). The areas or rows having adjacent headland portions with blocked ends are temporarily prohibited from passing and they are not authorised when a robot needs to change area.

All these known solutions, and especially the last one, result in complex management of headland passages when a fleet of several agricultural robots is used (prioritisation, avoidance of collisions, etc.).

The present invention aims to overcome these drawbacks, and in particular to provide a solution avoiding collisions management as much as possible and allowing efficient coordination of the various robots without them having to communicate with one another.

Thus, the invention relates to a method for working a plot of land simultaneously by a fleet of at least two agricultural machines or robots operating autonomously and independently, in accordance with instructions and/or commands transmitted by a common central management and control system, the method consisting in subdividing the plot of land to be worked, prior to starting working on this plot of land or progressively during the work thereon, into at least two distinct work areas, all work areas covering substantially the entire exploitable or usable surface of the plot of land, each work area consisting of a fraction of plot of land in the form of a strip with respective extremities at its two opposite ends, and a headland area extending along the various successive adjacent extremities at each of the two opposite ends of the strips, method characterised in that it consists in subdividing each headland area into headland portions, each of which is located facing and in the continuation of one of the two extremities of one of the strips forming work areas, and assigning at least a fraction of a headland portion, temporarily and exclusively, to the robot that either is about to pass or is in the process of passing through the considered headland portion, or is going to start, is in the process of completing or going to complete work in the work area associated with the considered headland portion, the actions and/or displacements of at least some of the other robots possibly being influenced by this temporary exclusive assignment, via the central management and control system.

The invention will be better understood on reading the following description, which relates to preferred embodiments, given as non-limiting examples, and explained with reference to the attached schematic drawings, in which.

As shown on FIGS. 2 to 6, the invention relates to a method for working a plot of land (P) simultaneously by a fleet of at least two agricultural machines or robots (R1, R2, . . . , Ri) operating autonomously and independently, in accordance with instructions and/or commands transmitted by a common central management and control system (SC).

This method consists in subdividing the plot of land (P) to be worked, prior to starting working on this plot of land (P) or progressively during the work thereon, into at least two distinct work areas (Z1, Z2, . . . , Zj), the work areas (Z1, Z2, . . . , Zj) covering substantially the entire exploitable or usable surface (SU) of the plot of land (P)—also referred to as the main field CP—, each work area (Z1, Z2, . . . , Zj) consisting of a fraction of plot of land in the form of a strip with respective extremities (EB, EB') at the two opposite ends, and a headland area (F, F') extending along the various successive adjacent extremities (EB or EB') at each of the two opposite ends of the strips (Z1, Z2, . . . , Zj).

This method is characterised in that it further consists in subdividing each headland area (F, F') into headland portions (PF1, PF1'; PF2, PF2'; . . . ; PFj, PFj'), each of which is located facing and in the continuation of one of the two extremities (EB and EB') of one of the strips forming work areas (Z1, Z2, . . . , Zj), and assigning at least a fraction of a headland portion (PF1, PF1'; PF2, PF2'; . . . ; PFj, PFj'), temporarily and exclusively, to the robot (R1, R2; . . . , Ri) that either is about to pass or is in the process of passing through the considered headland portion (PF1, PF1'; PF2, PF2'; . . . ; PFj, PFj'), or is going to start, is in the process of completing or going to complete work in the work area (Z1, Z2, . . . , Zj) associated with the considered headland portion (PF1, PF1', PF2, PF2'; . . . ; PFj, PFj'), the actions and/or displacements of at least some of the other robots possibly being influenced by this temporary exclusive assignment, via the central management and control system.

Obviously, the method according to the invention can also be applied to the lateral headland parts or areas FL, FL' that can extend on either side of the main field CP, along the direction of the rows, when such headland parts are present. In this case, each lateral headland part FL, FL' is worked like a headland portion PF.

Thus, by using the central management and control system to exclusively assign headland portions to certain agricultural robots, for given durations, the invention considerably simplifies the management of the fleet of robots which are simultaneously active on the same plot of land and more particularly the processing of potential collisions, by limiting the crossing between robots. In addition, the robots do not need to know the positions of the other robots and, above all, do not need to communicate with one another.

Generally and within the scope of the invention, a headland portion (or at least a fraction of such a portion) is made temporarily exclusive for a given robot when this robot requires it, at least for the time during which this robot is present therein. This exclusive assignment, with access prohibited to the other robots, is preferably at least slightly anticipated (before the robot actually enters the portion which is exclusively reserved for it) and may result from the application of various rules chosen by the user (prioritisation, chronological, depending on the type or robot, etc.).

According to a first simple implementation variant, the method may consist in assigning temporarily and exclusively a given headland portion or a fraction of a headland portion (PF1, PF1'; PF2, PF2'; . . . ; PFj, PFj') to the robot (R1, R2, Ri) which enters, or which is about to enter the considered headland portion or fraction of headland portion first.

According to a second implementation variant, a given headland portion or fraction of a headland portion (PF1, PF1'; PF2, PF2'; . . . ; PFj, PFj') could be assigned temporarily and exclusively to a specific robot (R1, R2, Ri) according to a predetermined prioritisation logic rule, applied by the common central management and control system (SC). Thus, in the case of agricultural robots of different width, priority can be given to the widest robots.

Obviously, the two headland portions PF and PF' located at the two opposite extremities EB and EB' of a same work area Z can be assigned temporarily and exclusively to two different robots (the one assigned to work area Z making for example a U-turn in a first portion, and the other robot-transiting between two areas-crossing the other portion).

According to a feature of the invention, the method consists, after exclusive assignment of a given headland portion (PF1, PF1'; PF2, PF2'; . . . ; PFj, PFj') to a specific robot (R1, R2, . . . , Ri), by application of a preprogrammed assignment rule in the common central management and control system (SC), in coordinating and controlling accordingly, as far as required, the operation and displacement of the other robots working on the plot of land (P), via the system (SC). This control of the other robots may for example consist in updating displacement areas whose access is temporarily prohibited to those of the other robots likely to transit via the exclusively assigned portion.

The width of the headland (F, F') depends on the width of the associated work area, its depth (dimension in the longitudinal direction of its associated work strip), as well as the width of the lateral headland parts (FL, FL') which may vary.

In particular, when the headland portions PF are very deep, the temporary exclusive assignment of a headland portion (PF1, PF1'; PF2, PF2'; . . . ; PFj, PFj') to a specific given robot (R1, R2, . . . , Ri), may only concern a fractional strip (BF) of the considered headland portion, which is directly adjacent to the extremity of the considered work area (EB, EB'). In other words, the complementary fractional strip of BF (which completes BF to form PFj) can remain open to traffic and access (the opposite may also apply-BF open). According to another variant, as shown on FIG. 7, the method consists in the temporary exclusive assignment of a headland portion (PF1, PF1'; PF2, PF2'; . . . ; PFj, PFj') as well as a fractional region (RF) of this portion, located inside the latter, and acting for example as waiting, parking, refuelling, maintenance area, etc. fora given robot (R1).

According to a feature of the invention, the temporary exclusive assignments of the headland portions (PF1, PF1'; PF2, PF2'; . . . ; PFj, PFj') to the various robots (R1, R2, . . . , Ri) are advantageously performed progressively, as the work carried out by the robots proceeds in the work areas (Z1, Z2, . . . , Zj) of the considered plot of land (P).

Thus, and depending on the chosen option, these work areas (Z1, Z2, . . . , Zj) can either all be determined before starting work on the considered plot of land (P) (pre-division of the plot of land), or be defined gradually as work proceeds in the plot of land (P). They may (or may not) all have the same width Lz (in particular when the robots are identical), except possibly a terminal or finishing strip BT of smaller width.

When the plot of land (P) has a surrounding peripheral headland, which comprises the two terminal headland areas (F, F') along the extremities (EB, EB') of the work areas (Z1, Z2, . . . , Zj) as well as two lateral headland areas (FL, FL') connecting the two above-mentioned terminal headland areas, some or all of each of these two lateral headland areas (FL, FL') may be assigned temporarily and exclusively to the robot (R1, R2, . . . , Ri) which enters the considered lateral headland area first.

According to an advantageous feature of the invention, each work area (Z1, Z2, Zj) may be assigned temporarily and exclusively to one of the agricultural robots (R1, R2, Ri), at least during the considered work phase (to be carried out by this robot). The width (Lz) of most of the work areas (Z1, Z2, Zj) is advantageously greater than or equal to the working width (Lr) of the agricultural robot (R1, R2, Ri) exclusively assigned to it, preferably equal to an integer multiple of this working width.

Furthermore, the exclusive assignment, as work proceeds on the plot of land (P), of the work areas (Z1, Z2, Zj) still to be worked, to the various agricultural robots (R1, R2, Ri), is performed progressively, as the work being carried out in the various work areas is completed by the agricultural robots which have been respectively assigned to them.

In addition, after an initial assignment of a first exclusive work area to each agricultural robot, the next assignments, at a given time as the work proceeds on the plot of land (P), of the future work areas, forming the remaining part of the plot of land (P) still to be worked (PRP), to the various agricultural robots can be performed progressively, as the work being carried out in the various work areas is completed by the agricultural robots which have been respectively assigned to them.

Advantageously, all the work areas (Z1, Z2, Zj) are assigned to the various agricultural robots (R1, R2, Ri), with an exclusive assignment of one robot per area, before or when starting work on the plot of land (P), a possible reassignment of the work areas still to be worked between the various considered agricultural robots being able to take place, at a given time as work proceeds on the plot of land (P), depending on behavioural change, availability and/or status of the various robots, or even on the actual or predictable progress of the work in the work areas still worked at the above-mentioned time by the respective robots which have been exclusively assigned to them.

Advantageously, the subdivision of the plot of land (P) and the assignment of the exclusive work areas (Z1, Z2, Zj) to the various agricultural robots (R1, R2, Ri) take into account a minimisation of the crossing between the robots in the headland(s) (F) when changing work areas, the exclusive assignment of a given work area (Z1, Z2, Zj) to a specific robot (R1, R2, Ri) resulting either in an exclusive temporary assignment, or at least a priority reservation, for the specific robot of the headland portion(s) facing and extending in the continuation of one of the two extremities (EB and EB') of the work area in the form of a strip (Z1, Z2, . . . , Zj).

Like the exclusive work areas, portions of adjacent headland portions may not directly abut.

The definition, exclusive assignment and management of work in such work areas may for example be carried out according to the method described in the French patent application No. FR2009696 filed today in the name of the applicant.

Figure 7:
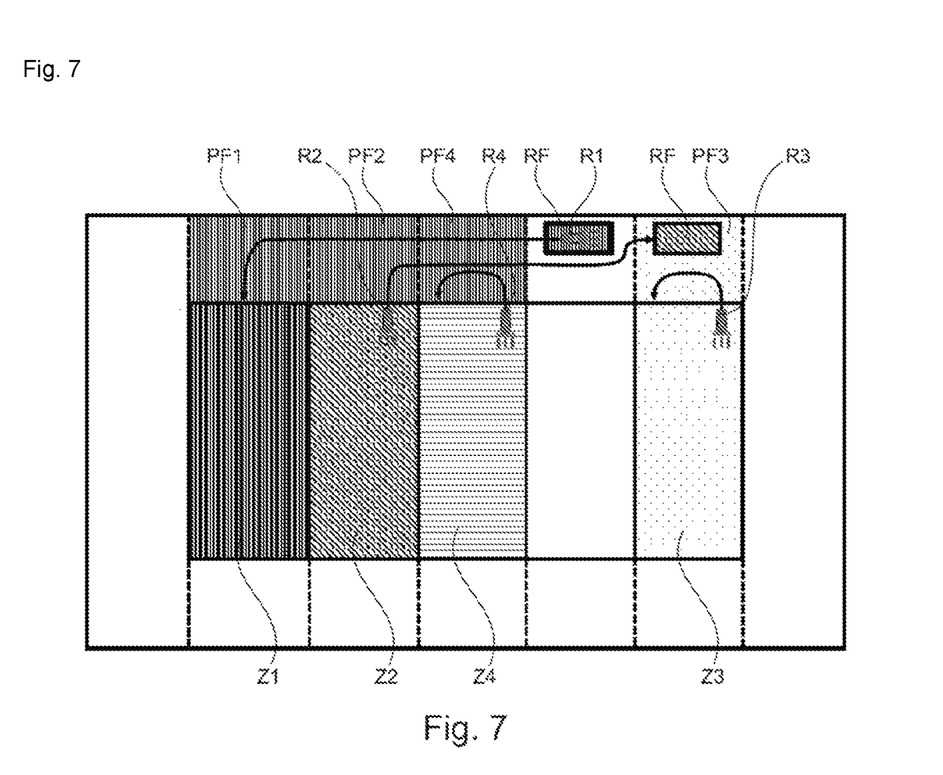

An example of a relatively complex situation for the management of possible collisions/conflicts is illustrated on FIG. 7. In this example, R1 and R2 are both in a situation of future transfer displacement, R1 wanting to leave its parking area (RF) to join a work area (Z1) which it has been assigned, and (R2) wanting to leave the work area (Z2) it has just finished to join a parking area (RF) located in the headland portion (PF3) extending in the continuation of the work area (Z3) worked by the robot (R3). The work area (Z4) for its part is worked by the robot (R4), and the robots (R3) and (R4) are about to carry out a U-turn in the headland portions (PF3 and PF4). In this context and this configuration, it may be decided to give priority to the first robot which moves. The figure shows that the robot (R1) was the first to move and all the headland portions (PF1, PF2 and PF4) which it must cross to join (Z1) are temporarily and exclusively reserved for it. Thus, at first, (R2) and (R4) are waiting in their respective work areas. However, R3 can carry out its U-turn since the headland portion (PF3) does not have to be crossed by (R1). Since (PF4) is temporarily reserved for (R1) to cross, (R4) must wait until (R1) has passed before carrying out its U-turn. However, it should be able to do so before (R2) joins (RF) in (PF3), since (PF4) will be released before (PF2) after the passage of (R1), unless a logic other than time prioritisation is applied in this case (for example, importance or size of the robot, task to be performed, etc.).

Figure 6:
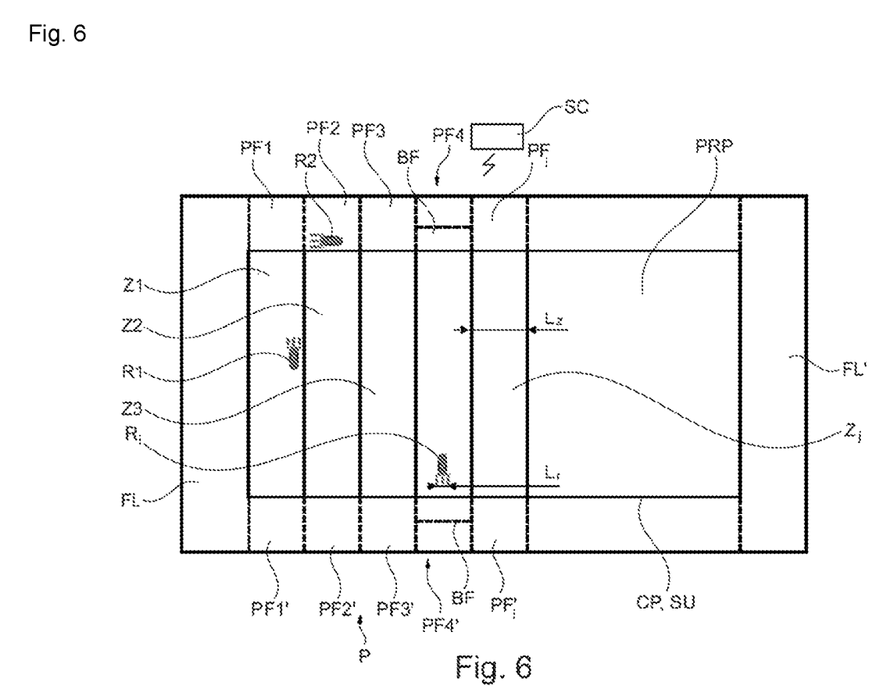
FIG. 6 shows the plot of land of FIG. 2 on which the main components forming an example of an agricultural machinery assembly for performing the method according to the invention (central management and control system-autonomous agricultural work robotic vehicles) are depicted, and, FIG. 7 shows a plot of land whose main field is worked by four different robots and shows a possible conflict/ collision situation between the robots, which is managed according to the invention (exclusive assignment of headland portions).

The invention also relates, as shown on FIG. 6, to an agricultural machinery assembly for the automated work of plots of land (P) comprising a fleet of at least two mobile agricultural machines or robots (R1, R2, Ri), equipped with suitable work tools, operating autonomously and independently, and a common central management and control system (SC) adapted to communicate with the robots to transmit them instructions and/or commands and receive in return information concerning the operation and/or status of the robots.

Each robot is provided with a satellite positioning or tracking device and the central management and control system (SC) comprises means for subdividing the plot of land (P) to be worked, prior to starting working on this plot of land (P) and/or progressively during the work thereon, into at least two distinct work areas (Z1, Z2, . . . , Zj).

All work areas covers substantially the entire surface of the plot of land. Each work area (Z1, Z2, . . . , Zj) consists of a fraction of plot of land in the form of a strip with respective extremities (EB, EB') at its two opposite ends, and a headland area (F, F') extends along the various successive adjacent extremities (EB or EB'), at each of the two opposite ends of the strips (Z1, Z2, . . . , Zj). Lateral headland areas (FL, FL') may be present if necessary.

According to the invention, the common central management and control system (SC) comprises means (data processing unit and calculation and control software) making it possible to subdivide each headland area (F, F') into headland portions (PF1, PF1'; PF2, PF2'; PFj, PFj'), each of which facing and being located in the continuation of one of the two extremities (EB and EB') of one of the strips forming work areas (Z1, Z2, . . . , Zj), and to assign at least a fraction of a headland portion (PF1, PF1'; PF2, PF2'; . . . ; PFj, PFj'), temporarily and exclusively, to the robot (R1, R2; . . . , Ri) that either is about to pass or is in the process of passing through the considered headland portion (PF1, PF1'; PF2, PF2'; . . . ; PFj, PFj'), or is going to start, is in the process of completing or going to complete work in the work area (Z1, Z2, . . . , Zj) associated with the considered headland portion (PF1, PF1'; PF2, PF2'; . . . ; PFj, PFj').

Preferably, this assembly implements the method described above to manage the fleet of robots (R1, R2, Ri) when working a plot of land (P).

Obviously, the invention is not limited to the embodiments described and shown in the attached drawings. Modifications remain possible, in particular concerning the composition of the various elements or by substitution of technical equivalents without departing from the scope of protection of the invention.

The invention claimed is:

1. A method for working a plot of land simultaneously by a fleet of agricultural robots operating autonomously and independently, in accordance with instructions and/or commands transmitted by a common central management and control system, the method comprising:
   subdividing the plot of land to be worked, prior to starting working on the plot of land or progressively during work thereon, into distinct work areas, all of the work areas covering substantially an entire exploitable or usable surface area of the plot of land, each work area including a fraction of the plot of land in a form of a strip with respective extremities at first and second ends thereof, and the plot of land including a first headland area extending along successive adjacent extremities at the first end of the strip and a second headland area extending along successive adjacent extremities at the second end of the strip;
   subdividing each of the first and second headland areas into headland portions, each of which facing and being located in continuation of one of the extremities of one of the strips forming work areas; and
   assigning a fraction of one of the headland portions, temporarily and exclusively, to one of the agricultural robots of the fleet that either is about to pass or is in the process of passing through one of the headland portions, is in the process of starting, completing or going to complete work in the work area associated to the one of the headland portions, such that the other agricultural robots are prohibited from traveling into the assigned one of the headland portions, via the central management and control system.

2. The method according to claim 1, wherein the assigned one of the headland portions is assigned first.

3. The method according to claim 1, wherein the assigned one of the headland portions is assigned according to a predetermined prioritization logic rule, applied by the central management and control system.

4. The method according to claim 1, further comprising coordinating and controlling the other agricultural robots working on the plot of land, via the central management and control system.

5. The method according to claim 1, wherein the assigned one of the headland portions only concerns a fractional strip of the assigned one of the headland portions, which is directly adjacent to an extremity of a considered work area.

6. The method according to claim 1, further comprising progressive performance of assigning a fraction of one of the headland portions.

7. The method according to claim 1, further comprising, when the plot of land has a surrounding peripheral headland, which comprises first and second terminal headland areas along the extremities of the work areas and first and second lateral headland areas connecting the first and second terminal headland areas, assigning temporarily and exclusively each of the first and second lateral headland areas to the one of the robots which enters the assigned each of the first and second lateral headland areas first.

8. The method according to claim 1, wherein a width of each of the work areas is greater than a width of the one of the agricultural robots.

9. The method according to claim 8, wherein, after an initial assignment of a first exclusive work area to each agricultural robot, the next assignments, at a given time as the work proceeds on the plot of land, of the future work areas, forming the remaining part still to be worked of the plot of land, to the agricultural robots are performed progressively, as the work being carried out in the work areas is completed by the agricultural robots which have been respectively assigned to the work areas.

10. The method according to claim 8, wherein all the work areas are assigned to the agricultural robots, with an exclusive assignment of one robot per work area, before or when starting work on the plot of land, and a possible reassignment of the work areas still to be worked between the agricultural robots being able to take place, at a given time as work proceeds on the plot of land.

11. The method according to claim 1, wherein the subdividing and the assigning take into account a minimization of crossing between the agricultural robots in the headland areas.

12. An agricultural machinery assembly for the automated work of plots of land comprising:
   a fleet of agricultural machines or robots, equipped with suitable work tools, operating autonomously and independently; and
   a common central management and control system adapted to communicate with the robots to transmit the robots instructions and/or commands and receive in return information concerning the operation and/or status of the robots, each robot further being provided with a satellite positioning or tracking device,
   wherein the assembly is configured to perform the method according to claim 1 to manage the fleet of agricultural robots when working a plot of land.

13. An agricultural machinery assembly for automated work of plots of land comprising:
   a fleet of agricultural robots, equipped with suitable work tools, operating autonomously and independently; and
   a common central management and control system adapted to communicate with the robots to transmit the agricultural robots instructions and/or commands and receive in return information concerning the operation and/or status of the robots, each robot further being provided with a satellite positioning or tracking device, the central management and control system comprising a processor configured to
   subdivide the plot of land to be worked, prior to starting working on the plot of land or progressively during work thereon, into distinct work areas, all of the work areas covering substantially an entire exploitable or usable surface area of the plot of land, each work area including a fraction of the plot of land in a form of a strip with respective extremities at first and second ends thereof, and the plot of land including a first headland area extending along successive adjacent extremities at the first end of the strip and a second headland area extending along successive adjacent extremities at the second end of the strip,
   subdivide each of the first and second headland areas into headland portions, each of which facing and being located in continuation of one of the extremities of one of the strips forming work areas, and
   assign a fraction of one of the headland portions, temporarily and exclusively, to one of the agricultural robots of the fleet that either is about to pass or is in the process of passing through the one of the headland portions, or is going to start, is in the process of completing or going to complete work in the work area associated to the one of the headland portions, such that the other agricultural robots are prohibited from traveling into the assigned one of the headland portions.

* * * * *